United States Patent [19]

Behr

[11] Patent Number: 4,525,462
[45] Date of Patent: Jun. 25, 1985

[54] DARK BLUE DYED FURNACE SIGHT GLASS WITH HIGH INFRARED ABSORPTION

[75] Inventor: Werner Behr, Alfeld, Fed. Rep. of Germany

[73] Assignee: Deutsche Spezialglas AG, Delligsen, Fed. Rep. of Germany

[21] Appl. No.: 498,421

[22] Filed: May 26, 1983

[30] Foreign Application Priority Data

May 27, 1982 [DE] Fed. Rep. of Germany ....... 3220072

[51] Int. Cl.$^3$ .............................................. C03C 3/04
[52] U.S. Cl. .......................................... 501/71; 65/29; 65/30.1; 65/90; 432/32; 501/31; 501/904; 501/905
[58] Field of Search .................. 501/904, 71, 905, 32; 350/1.1; 250/505.1; 432/32

[56] References Cited

U.S. PATENT DOCUMENTS

| 2,034,994 | 3/1936 | Sharp et al. | 501/71 |
| 2,755,212 | 7/1956 | Brown | 501/905 |
| 3,378,431 | 4/1968 | Smith et al. | 501/32 |

FOREIGN PATENT DOCUMENTS

| 1389087 | 1/1965 | France | 250/505.1 |
| 53-25615 | 3/1978 | Japan | 501/904 |
| 1163482 | 9/1969 | United Kingdom | 501/904 |

*Primary Examiner*—Helen M. McCarthy
*Attorney, Agent, or Firm*—Pollock, Vande Sande & Priddy

[57] ABSTRACT

Dark blue dyed furnace sight glass of soda-lime-silica further containing carbon and oxides of iron and cobalt with substantially no infrared transmission and which sight glass affords a view of details in the melting operation. Other ingredients may include $K_2O$, $MgO$, $Al_2O_3$ or $ZrO_2$.

4 Claims, 3 Drawing Figures

Transmission curve of protective glass 4-6

Temperature measurement
F. Henning, H. Moser, 3rd Edition
Springer-Verlag Berlin, Heidelberg, New York Fig. 33 Spectral radiation density of the Black Body
(Wellenlänge = Wave Length)

Transmission curve of glass with 0.2% CoO

Transmission curve of protective class 4-6

DARK BLUE DYED FURNACE SIGHT GLASS WITH HIGH INFRARED ABSORPTION

TECHNICAL FIELD

The invention concerns a dark blue furnace sight glass which has a high infrared absorption.

BACKGROUND OF THE INVENTION

Furnace sight glasses (IR protection filters) are required in order to protect the human eye against the intensive radiation of hot bodies in the visible and in the infrared spectral area. The radiation of such bodies is increased in its intensity with the temperature of the bodies; the wave length is shifted with the rising temperature from the infrared spectral area into the visible one (0.4–0.8 μm) (see FIG. 1).

For this reason, there is not just one furnace sight glass but, depending on the temperature of the radiating body, a glass with a certain light transmission degree to which a protective class is allocated.

Since infrared radiation can harm the eye (lens cloudiness), a minimum infrared absorption is specified for each protective class graded by medical points of view (see DIN 4647, Part 3). This standard is also a portion of the law covering technical working means (GTA).

For decades, two types of glasses have been industrially produced:

1. glasses dyed dark blue with cobalt and copper compounds which, however, do not have the minimum infrared absorption required according to DIN 4647, Part 3,
2. grey to green furnace sight glasses dyed with iron compounds which have the necessary infrared protection.

DISCLOSURE OF THE INVENTION

Even though the furnace sight glasses dyed blue with cobalt and copper compounds do not give the necessary protection to the eye, they are readily used because details can be better determined in the melting operation.

On the one hand, this is based on the relatively steep decrease of the radiation of a hot body in the visible range in the direction of shorter wave lengths (see FIG. 1) and the steep decrease of the permeability of a glass dyed with cobalt compounds in the visible spectral area in the direction of the longer wave lengths (see FIG. 2).

The intersecting of the emission curve of the radiating body with the absorption curve of the glass results in a distinctly visible luminous density difference at slight differences in temperature, for example, between the slag and the liquid iron which is hotter than the slag owing to the better thermal conductivity.

It is the objective of the present invention to create a new furnace sight glass which combines the transmission characteristics of a glass, dyed with cobalt compounds, in the visible spectral area with the infrared absorption of the glass dyed with iron compounds. This objective is achieved with a furnace sight glass in accordance with the patent claims.

It was surprisingly determined that it is possible to increase the infrared absorption of the iron, by adding strong reducing agents to the amount of basic glass containing iron compounds, to such an extent that the minimum infrared absorption specified in DIN 4647, Part 3, is achieved for the new furnace sight glass even with relatively low iron contents. The iron content can be so low that no disturbing green coloring is effected yet. The glasses according to the invention show the typical cobalt transmission curve in the visible spectral area (see FIG. 3). The thickness of the glass in FIG. 3 is 2.35 millimeters and it has the composition given in Table 1 for protective class 4-6.

BRIEF DESCRIPTION OF THE DRAWINGS

The invention may be understood further by reference to the accompanying drawings in which.

DESCRIPTION OF BEST MODE AND OTHER EMBODIMENTS OF THE INVENTION

Figure 1:
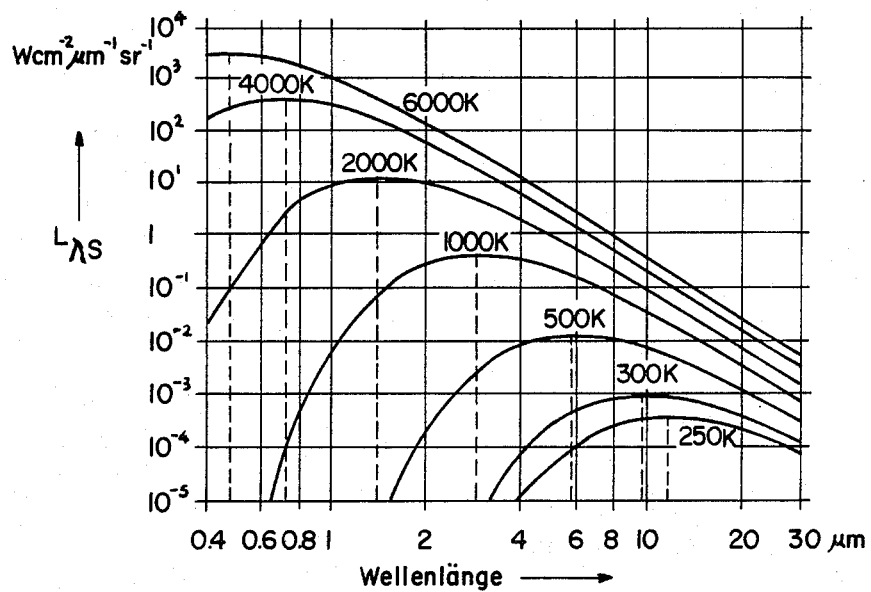
FIG. 1 shows the spectral radiation density of a black body at different temperatures.
Figure 2:
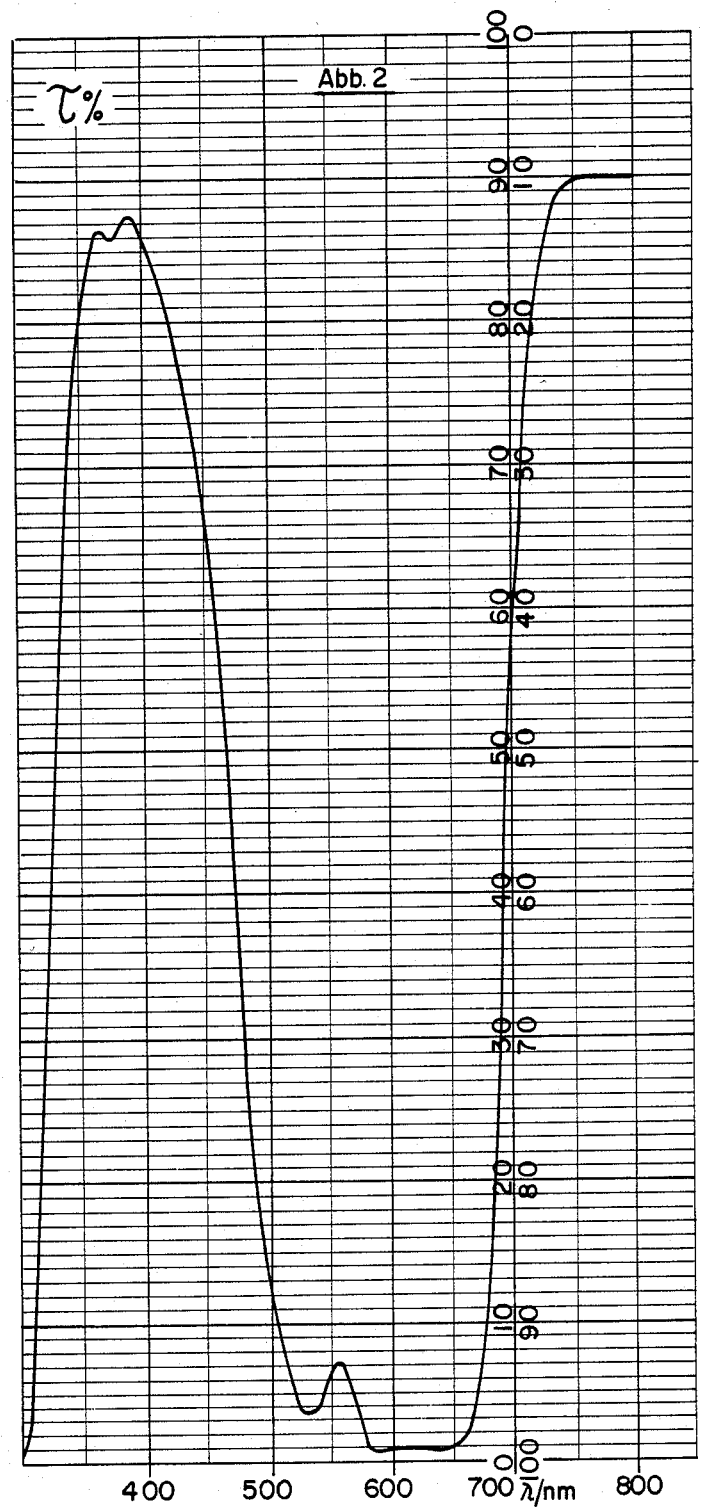
FIG. 2 shows the transmission curve of a basic glass containing 0.2 percent cobalt oxide; and, FIG. 3 shows the transmission curve of a sight glass according to the invention.
Figure 3:
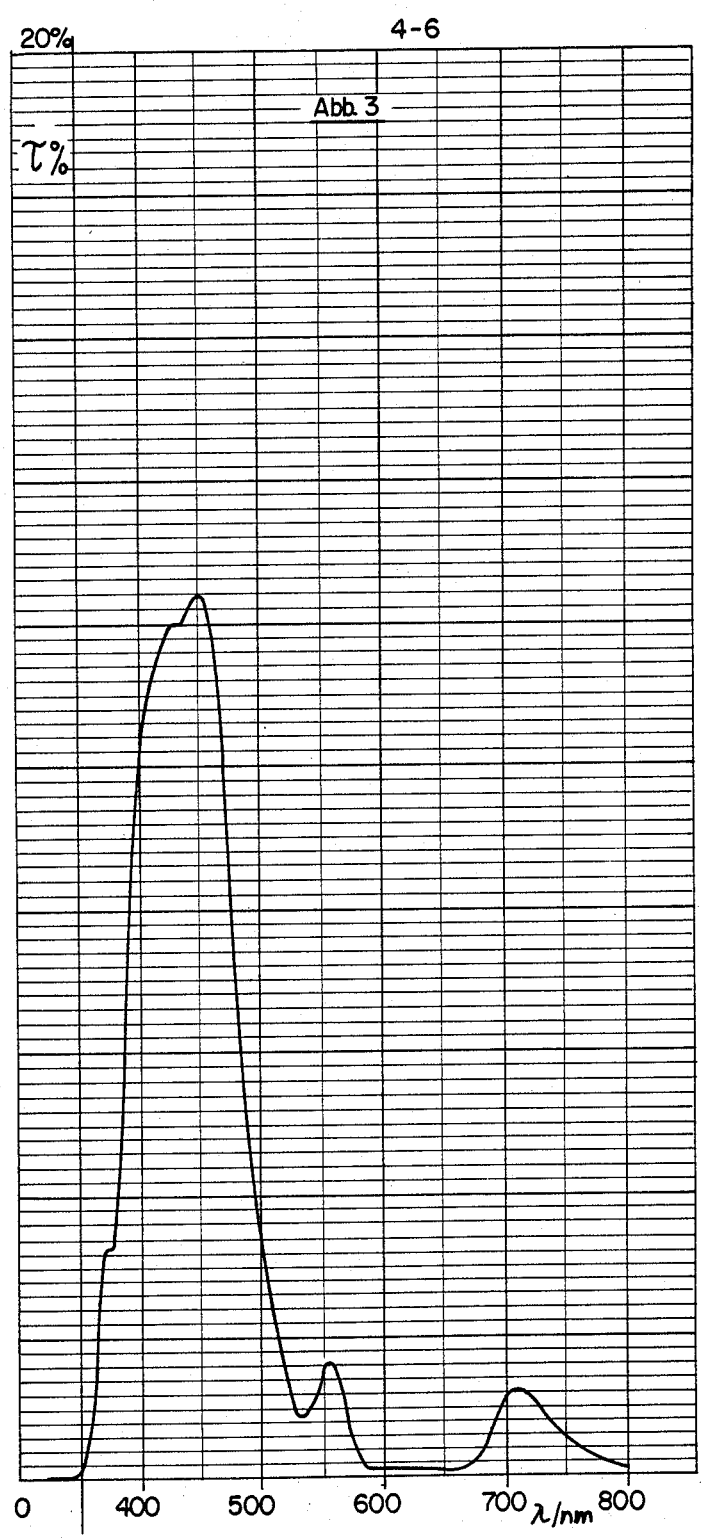

Four exemplary glass compositions according to the invention are compiled in the Table 1 for four protective classes. The new glasses can be produced using customary technologies; they have, in particular, the advantage that, owing to their composition, they are devitrification-resistant to such an extent that they can be produced according to the Fourcault drawing process.

TABLE 1

| | Protective Class | | | |
|---|---|---|---|---|
| | 4-4 | 4-5 | 4-6 | 4-7 |
| $SiO_2$ | 71,8 | 69,8 | 69,0 | 67,8 |
| $Al_2O_3$ | — | — | 2.7 | 1,7 |
| $ZrO_2$ | — | 2,5 | — | 1,0 |
| $Na_2O$ | 13,2 | 13,2 | 12,5 | 14,5 |
| $K_2O$ | 1,2 | 1,2 | 3,4 | 2,2 |
| CaO | 5,63 | 5,16 | 4,8 | 4,2 |
| MgO | 3,85 | 3,53 | 3,3 | 2,9 |
| $Fe_3O_4$ | 2,47 | 3,23 | 4,1 | 4,75 |
| CoO | 0,124 | 0,162 | 0,205 | 0,24 |
| C | 0,22 | 0,22 | 0,30 | 0,45 |

The glass composition according to the invention is characterized more generally by the following ranges of ingredients (in percent by weight):

| | |
|---|---|
| 65–72 | $SiO_2$ |
| 0–3 | $Al_2O_3$ |
| 0–3 | $ZrO_2$ |
| 12–16 | $Na_2O$ |
| 0–5 | $K_2O$ |
| 2.5–10 | CaO |
| 0–4 | MgO |
| 2.2–4.9 | $Fe_3O_4$ |
| 0.1–0.35 | CoO |
| 0.2–0.5 | C |

I claim:

1. Dark blue dyed furnace sight glass with a high infrared absorption, characterized by the fact that it has been melted from an amount of basic glass containing iron compounds to which a carbon containing reducing agent is added, its blue coloring being due to at least one cobalt compound and its iron, carbon and cobalt contents being such that the absorption characteristics of the glass in the visible spectral area provide distinctly visible details at slight differences in temperature between different portions of a radiating body and in the infrared spectral area provide substantially no transmittance of wavelengths of about 800 nanometers, the glass characterized by the following composition (in percent by weight):

| | |
|---|---|
| 65–72 | $SiO_2$ |
| 0–3 | $Al_2O_3$ |
| 0–3 | $ZrO_2$ |
| 12–16 | $Na_2O$ |
| 0–5 | $K_2O$ |
| 2.5–10 | CaO |
| 0–4 | MgO |
| 2.2–4.9 | $Fe_3O_4$ |
| 0.1–0.35 | CoO |
| 0.2–0.5 | C |

2. The sight glass of claim 1 in which said magnesium oxide is present in said composition in an amount in the range of 2.9–4 percent by weight.

3. The sight glass of claim 1 in which said reducing agent consists essentially of carbon or a carbon containing compound.

4. The sight glass of claim 1 in which said glass composition is sufficiently devitrification-resistant to be produced according to the Fourcault drawing process.

* * * * *